US012485058B2

(12) United States Patent
Joiner, Jr.

(10) Patent No.: US 12,485,058 B2
(45) Date of Patent: Dec. 2, 2025

(54) SELF-MASSAGE TOOL FOR COMBATING LOWER BACK AND HIP PAIN

(71) Applicant: James P Joiner, Jr., Odessa, FL (US)

(72) Inventor: James P Joiner, Jr., Odessa, FL (US)

( * ) Notice: Subject to any disclaimer, the term of this patent is extended or adjusted under 35 U.S.C. 154(b) by 0 days.

(21) Appl. No.: 18/900,243

(22) Filed: Sep. 27, 2024

(65) Prior Publication Data

US 2025/0114270 A1 Apr. 10, 2025

Related U.S. Application Data

(60) Provisional application No. 63/542,680, filed on Oct. 5, 2023.

(51) Int. Cl.
*A61H 15/00* (2006.01)

(52) U.S. Cl.
CPC . *A61H 15/0092* (2013.01); *A61H 2015/0035* (2013.01); *A61H 2201/0107* (2013.01); *A61H 2201/1692* (2013.01); *A61H 2205/081* (2013.01); *A61H 2205/088* (2013.01)

(58) Field of Classification Search
CPC ................ A61H 15/00; A61H 15/0092; A61H 2015/0035; A61H 7/00; A61H 7/003; A61H 2201/1692; A61H 2201/0107; A61H 2203/0456; A61H 2205/081; A61H 2205/088
See application file for complete search history.

(56) References Cited

U.S. PATENT DOCUMENTS 3,078,484 A * 2/1963 Briggs .................... A47K 7/043 4/606
9,649,246 B1 5/2017 Johnson
9,849,065 B1 * 12/2017 Kozlevcar .............. A61H 39/04
10,765,589 B2 * 9/2020 Fleming ............... A47G 9/1081
2007/0232966 A1 * 10/2007 Applebaum ....... A61H 15/0085 601/17
2010/0191161 A1 * 7/2010 Mouatt ............. A63B 21/0552 601/137
2012/0028765 A1 * 2/2012 Morin ................ A63B 23/1227 482/91

(Continued)

FOREIGN PATENT DOCUMENTS

CN 2121233 U 11/1992
CN 101744707 A 6/2010

(Continued)

*Primary Examiner* — Colin W Stuart
*Assistant Examiner* — Douglas Y Sul
(74) *Attorney, Agent, or Firm* — Derek Fahey, Esq.; The Plus IP Firm, PLLC

(57) ABSTRACT

The invention relates to a massage tool that includes a rod and a first body with an upper and lower part. The lower part of the first body is movably connected to the rod, allowing it to move along the length of the rod. The upper part has two arms that extend upward, with a rolling member mounted between them. The upper part can rotate relative to the lower part. A locking mechanism is connected to the lower part of the first body, capable of switching between a locked and an unlocked position. In the locked position, the first body is prevented from moving along the rod, while in the unlocked position, it is free to move. This design provides flexibility in adjusting the tool's position and functionality.

14 Claims, 18 Drawing Sheets

(56) References Cited

U.S. PATENT DOCUMENTS

| | | | | |
|---|---|---|---|---|
| 2016/0113837 | A1 | 4/2016 | Burson | |
| 2018/0280228 | A1 | 10/2018 | Bouch et al. | |
| 2018/0296430 | A1 | 10/2018 | Bouch et al. | |
| 2019/0038500 | A1 * | 2/2019 | Lehti | A61H 15/00 |
| 2019/0231636 | A1 | 8/2019 | Olschansky et al. | |
| 2020/0368101 | A1 | 11/2020 | Nash | |
| 2021/0030617 | A1 * | 2/2021 | Penn | A61H 39/04 |
| 2022/0096314 | A1 * | 3/2022 | Nagy | A61H 15/00 |
| 2022/0347036 | A1 * | 11/2022 | Dossman | A63B 23/035 |
| 2024/0009070 | A1 * | 1/2024 | Yarro | A61N 5/0616 |
| 2024/0307262 | A1 * | 9/2024 | Williams | A61H 23/006 |

FOREIGN PATENT DOCUMENTS

| | | | | |
|---|---|---|---|---|
| CN | 102475621 | A | 5/2012 | |
| CN | 110038261 | A | 7/2019 | |
| CN | 217772769 | U | 11/2022 | |
| DE | 202016001656 | U1 | 7/2016 | |
| DE | 202016001648 | U1 * | 9/2016 | A61H 15/00 |
| EP | 2174632 | A1 | 4/2010 | |
| EP | 3536298 | A1 | 9/2019 | |
| KR | 20170102834 | A | 9/2017 | |
| WO | 2018152645 | A1 | 8/2018 | |

* cited by examiner

SELF-MASSAGE TOOL FOR COMBATING LOWER BACK AND HIP PAIN

REFERENCE TO RELATED APPLICATIONS

This application is a Non-Provisional Application which claims the benefit and priority to the filing date of U.S. Provisional Application Ser. No. 63/542,680 titled "SELF-MASSAGE TOOL FOR COMBATING LOWER BACK AND HIP PAIN" and filed Oct. 5, 2023, and the subject matter of which is incorporated herein by reference.

TECHNICAL FIELD

The present invention relates to the field of tools for providing therapeutic massage, and more specifically to a self-massage tool for combating pain in a user body.

BACKGROUND

Therapeutic massage, referred to as "massage therapy," is a direct approach to treating various physical and psychological conditions through manipulation of soft tissues in a human body. Massage therapy is a recognized and widely practiced form of complementary and alternative medicine and provides therapeutic benefits, including relaxation, pain relief, and improved well-being. The field of massage therapy has a long history of employing various instruments and devices to enhance the effectiveness of manual massage techniques.

Traditional massage tools, such as hands, fingers, and palms, have been the primary means of delivering massage therapy for centuries. The demand for more efficient, precise, and versatile massage tools has led to ongoing innovation in this field. massage tools have evolved significantly over time, with technological advancements leading to the creation of complex massage tools that incorporate motors and require assistance of another person for effective use. These tools offer certain benefits, they also come with several challenges and limitations that impact their usability and accessibility.

Many massage tools have intricate designs and incorporate heavy motors or mechanical components. These tools often aim to provide deeper and more targeted massage. Complex and motorized massage tools can be cumbersome and challenging for individuals to operate on their own, especially for those with limited mobility or dexterity. The weight and design of these tools can make them impractical for self-use. Such massage tools are heavy and complex and are often not portable or easy to transport. Many of these massage tools require another person, such as a massage therapist or a willing partner, to administer the massage effectively. This dependency restricts the ability of individuals to receive massages at their convenience.

One of the most common self-massage tools currently available is the standard massage ball, which users roll over various parts of their body to relieve muscle tension. While these tools are popular due to their simplicity and affordability, they suffer from several limitations. Most notably, the rolling action of a massage ball provides limited control over the pressure and movement, making it difficult to target specific areas of the body with precision. Users often struggle to maintain consistent pressure, especially on harder-to-reach areas such as the back, shoulders, or neck, which diminishes the therapeutic effect.

Additionally, due to the round shape of traditional massage balls, they tend to roll away easily, requiring users to constantly reposition themselves or the tool. This lack of stability can lead to frustration, making it difficult to maintain focus on the therapeutic benefits of the massage. Moreover, without a mechanism to lock the tool in place or control its movement, the effectiveness of the massage is often compromised, particularly when trying to apply targeted pressure for muscle knots or deep tissue work.

Another issue with standard massage balls is that they provide a uniform level of pressure, which may not be suitable for all users or all areas of the body. For example, more delicate or sensitive areas may require a lighter touch, while denser muscle tissue may benefit from deeper pressure. The inability to adjust or fine-tune the pressure with existing tools makes them less versatile and less effective for individualized treatment.

Existing motorized or more advanced massage tools, while offering deeper pressure and targeting, also come with their own set of drawbacks, such as being heavy, cumbersome, and often requiring assistance from another person. These tools can be expensive, non-portable, and not user-friendly for self-massage. Individuals looking for a balance between simplicity and effectiveness often find themselves limited by the available options in the market.

As a result, there exists a need for improvements over the prior art and more particularly for a more efficient massage tool having a simple construction that provides ease of use to users.

SUMMARY

A self-massage tool for combating lower back and hip pain is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the self-massage tool comprises a frame having two rods having a uniform length, the two rods disposed parallel to each other, a first body movably coupled to each of the two rods of the frame such that the first body is slidable along the length of the two rods, wherein the first body comprises an upper part and a lower part, the upper part comprising a cradle having mounted thereto a first rolling disc, and the upper part is rotatable relative to the lower part along an axis of the first body. In other embodiments, the rods may not be parallel with each other so long as the device is within the scope of the present invention. The self-massage tool has a second body movably coupled to the two rods of the frame, the second body configured to slide along the length of the two rods such that the first body and the second body are positioned at different locations on the frame relative to each other, wherein the second body comprises an upper part and a lower part, the upper part of the second body comprises a second cradle having mounted thereto a second rolling disc. Each of the first rolling disc and the second rolling disc is configured to apply a pressure on a user's body part in a first configuration, and the upper part of the second body is rotatable relative to the lower part of the second body along an axis of the second body. The upper part of the first body and the upper part of the second body are configured to be rotated and positioned in different orientations relative to each other. The self-massage tool has a first locking mechanism coupled to each of the lower part of the first body and the lower part of the second body, wherein the first locking mechanism is configured to move between a locked position and an unlocked position. The first body and the second body are prevented from sliding on the two rods in the locked position and the first body and the second body are slidable on the two rods in the unlocked position.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1A:
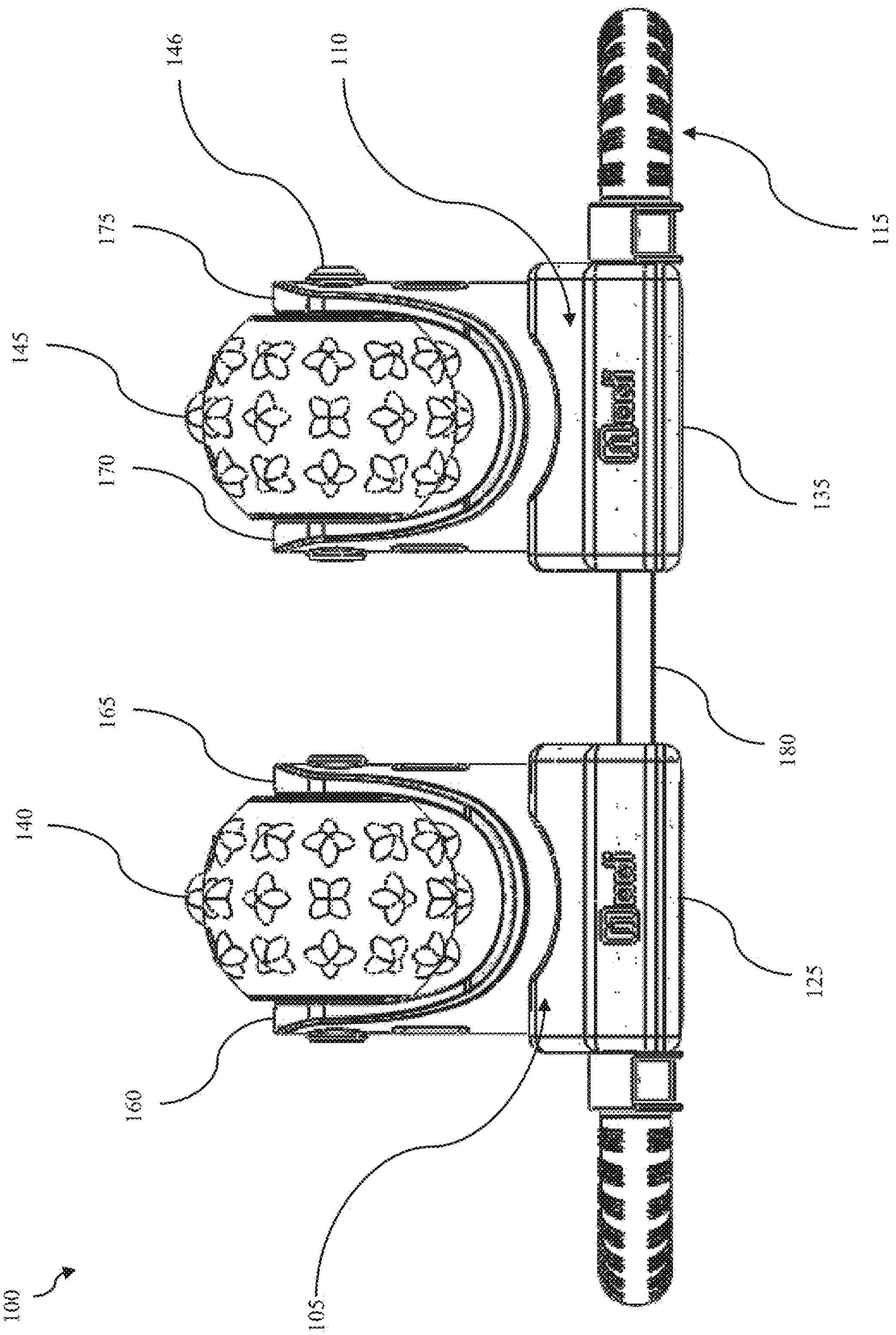
FIG. 1A is a front view of a self-massage tool for combating lower back and hip pain, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a self-massage tool for combating lower back and hip pain. In one embodiment, the self-massage tool improves over the prior art by providing a simple construction that is convenient to operate and use by a user. The self-massage tool does not have any complex mechanical components or motor that makes the tool heavy, complex to operate and difficult to carry. The self-massage tool provides improved portability due to simpler design and relatively lighter weight. In one embodiment, the self-massage tool also improves over the prior art by enabling the user to use and operate the self-massage tool without administration or support from another user, such as a massage therapist. In one embodiment, the self-massage tool improves over the prior art by providing flexibility of types and size of rolling discs used in the self-massage tool. The self-massage tool provides an option to attach different types of rolling discs to the tool. In addition, two rolling discs may be connected via a connector to obtain a rolling disc with a different size and shape. This improves adjustability of the self-massage tool and enhances user experience.

Figure 1B:
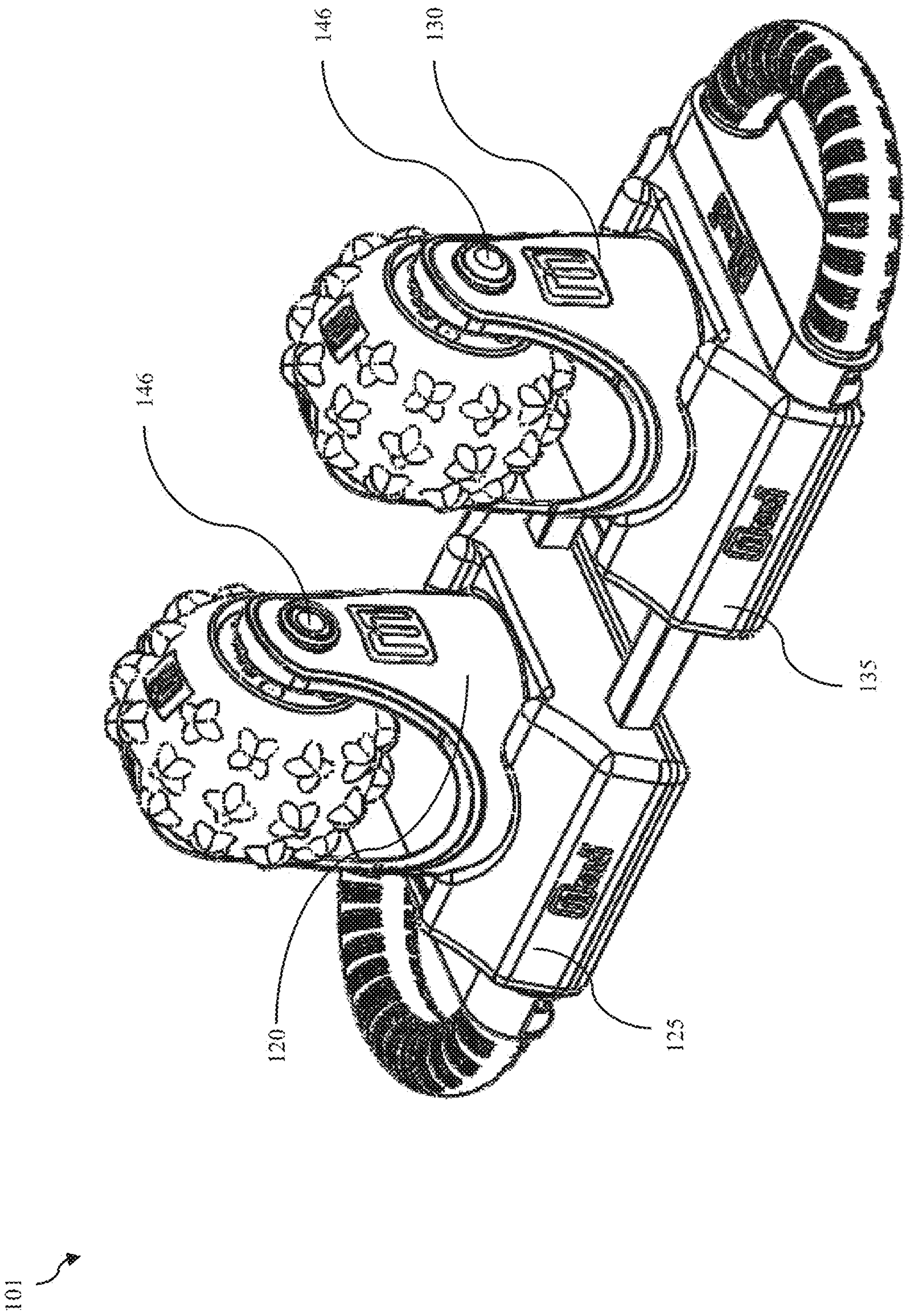
FIG. 1B is a perspective view of a self-massage tool, according to an example embodiment.
Figure 1C:
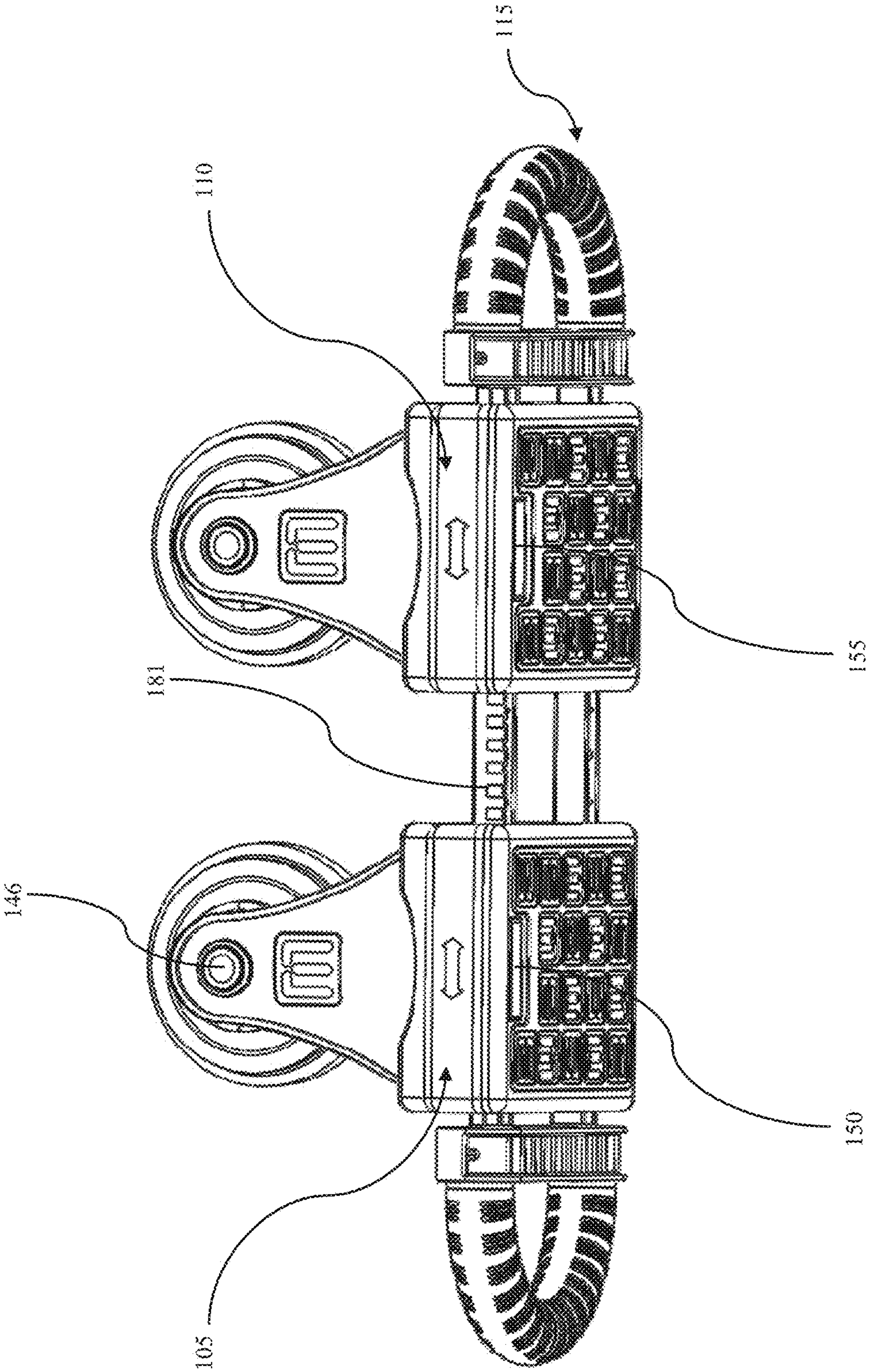
FIG. 1C is a bottom perspective view of a self-massage tool, according to an example embodiment.

Referring now to the Figures, FIGS. 1A-1C illustrate various views of a self-massage tool 100 for combating lower back and hip pain. FIG. 1A is a front view of the self-massage tool, sometimes referred to as a massage tool, that comprises a first body 105, and a second body 110, and a frame 115, the first body 105 and the second body 110 mounted on the frame 115.

The frame 115 has at least one rod 180. The first body 105 is movably coupled to at least one rod of frame 115 such that the first body 105 is movable along the length of the rod. In some embodiments, the frame 115 may have a second rod. In an example, a distance between the two rods is based on the width and size of the first body 105 and the second body 110, such that the first body 105 and the second body 110 is mounted on the two rods and can move along the length of the rods. FIG. 1B is a perspective view of the self-massage tool. The first body 105 has an upper part 120 and a lower part 125. In an embodiment, the second body 110 has the same structure as the first body 105 and has an upper part 130 and a lower part 135. The upper part 120 comprises a first arm 160 and a second arm 165 with a first rolling member 140 mounted in between the first arm and second arm. The upper part 130 of the second body 110 comprises a first arm 170 and a second arm 175 with a second rolling member 145 mounted in between the first arm and second arm. In an embodiment, the upper part 120 is rotatable relative to the lower part 125 along an axis of the first body 105. The first rolling member 140 and the second rolling member 145, during use by a user, apply a pressure on the user's body part in a first configuration. Each of the first rolling member 140 and the second rolling member 145 is removably attached to their respective body and is rotatable within the body along a respective axis. Each rolling member may be a cylindrical or spherical shape, or any other rounded shape such as a disk or ball. The rolling member may be flat surfaced or comprise a series of features such as concentric grooves, rings, or knobs wrapping around its circumference. These additional features provide some additional tactile feedback as the massage tool is in use. In an example, a rolling member comprises pins 146 on opposing sides of the rolling member, the opposing pins allow the rolling member to be removably connected to the body such that the rolling member is nestled between the first arm and the second arm. Pins 146 may be spring loaded such as push pins to allow for quick engagement and release to and from the body.

The second body 110 is movably coupled to at least one rod of the frame 115 such that the second body 110 may slide along the length of the rod. The first body 105 and the second body 110 may slide with respect to each other such that the first body 105 and the second body 110 are positioned at different locations on the frame 115 relative to each other. The upper part 130 of the second body 110 is rotatable relative to the lower part 135 of the second body 110 along an axis of the second body. In example, the axis of rotation of the upper part 120 of the first body 105 and the axis of rotation of the upper part 130 of the second body 110 are parallel to each other. The rotation of the upper parts 120, 130 of the first body 105 and the second body 110 provides different orientations of the first and second rolling members 140, 145 in which the self-massage tool 100 may be used by the user. As disclosed herein, the second body 110 has the same structure as the first body 105, however, the second body 110 having a different structure and shape than the first body 105 is also covered within the scope of the present invention.

The self-massage tool 100 also has a first locking mechanism (shown in FIGS. 8A and 8B) coupled to the lower part 125 of the first body 105 and a second locking mechanism coupled to the lower part 135 of the second body 110. FIG. 1C, a bottom view of the self-massage tool, illustrates the first body 105 has a button 150 on the bottom surface, and the second body 110 has a button 155 on its bottom surface. However, other interfaces other than buttons may be used and are within the scope of the present invention. Furthermore, at least one rod 180 may comprise a series of recesses, protrusions, or rod teeth 181 along the length of the rod. Each body 105, 110 has its respective locking mechanism positioned adjacent to a point of connection between the rods and the lower part of each body. The first locking mechanism and second locking mechanism are configured to move between a locked position and an unlocked position via the buttons 150, 155. In the locked position, the first locking mechanism and second locking mechanism are configured to engage with the rod teeth 181 of the rod. In an example, when the user presses the buttons 150, 155 the respective locking mechanisms are in the unlocked position, and when the user releases the buttons 150, 155 the respective locking mechanisms move to the locked position. In the locked position, the first body 105 and the second body 110 are prevented from moving along the rod and, in the unlocked position, the first body 105 and the second body 110 are movable along the rod. In the locked position, the locking mechanisms engage with the teeth, by way of a lever, pawl, recess, or additional teeth to prevent the body from moving along the frame.

The self-massage tool 100 also has a third locking mechanism (not shown in the figure) coupled to each of the upper parts 120, 130 of the first and second bodies 105, 110. The third locking mechanism is used for locking the upper parts 120, 130 in a fixed position when the upper parts are rotated relative to the lower parts 125, 135. The rotation allows the user to change the orientation of the first rolling member 140 and the second rolling member 145 relative to each other. In some embodiments, the third locking mechanism is a circular ratchet lock, allowing the upper parts 120, 130 to rotate in one direct (e.g., clockwise) and prevent rotation in an opposite direction (e.g., counterclockwise). The circular ratchet lock provides fine control over the rotation of the upper parts 120, 130, allowing them to be fine-tuned to the desired massage tool setting. In some embodiment, a release mechanism can be triggered to disengage the ratchet lock, allowing free rotation in both directions. This mechanism might involve pulling a lever, pressing a button, or rotating the lock out of engagement manually. In some embodiments, the locking mechanism is a soft lock and allows rotation in both directions.

Figure 2:
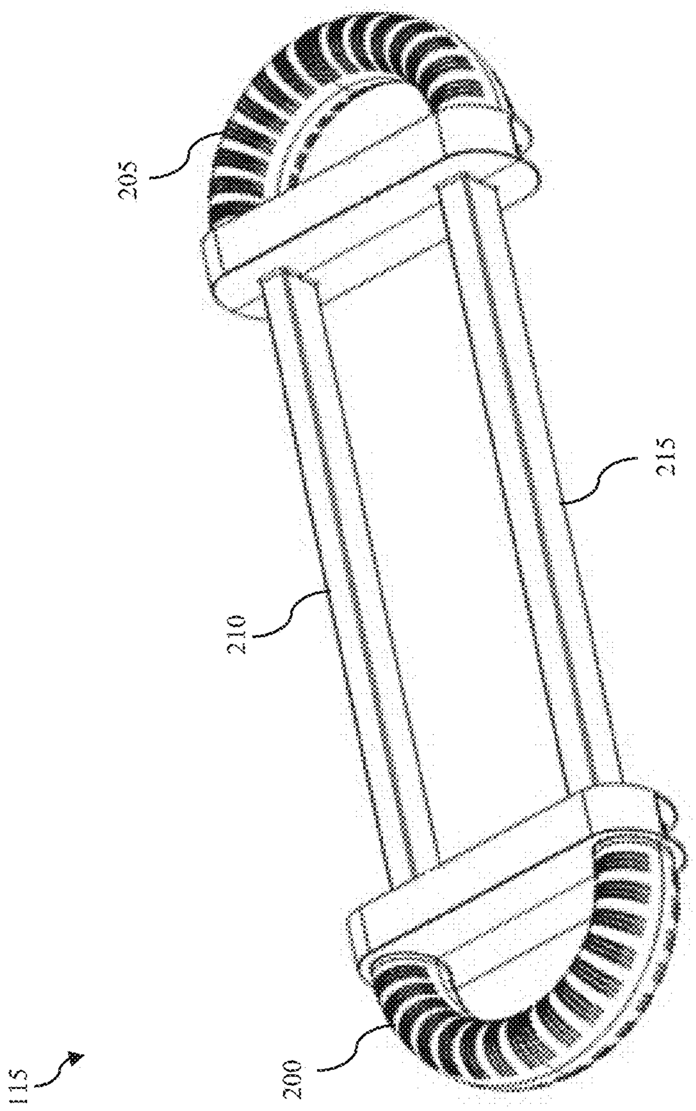
FIG. 2 is a perspective view of a frame comprising two rods for a self-massage tool for combating lower back and hip pain, according to an example embodiment.

FIG. 2 illustrates a perspective view of frame 115, according to an embodiment of the invention. As shown, frame 115 has two curved handles 200, 205 on two ends of the frame 115. The handles 200, 205 provide the user to grip the self-massage tool during operation and use. As disclosed herein, frame 115 has two handles that are D-shaped. However, it is understood that other shapes, such as, but not limited to, straight handles, contoured handles, U-shaped handles, and T-bar handles for the self-massage tool 100 may also be covered within the scope of the present invention. In some embodiments, frame 115 does not have any handles. In an example, the handles 200, 205 are curved and have textured or ridged surfaces to provide a better grip. Such textured or ridged surfaces can be especially useful when working with oils or lotions during massages. In another example, the curved handles 200, 205 may be adjustable or telescopic in length. The adjustable handle allows user to customize length of the handles as per preference of the user, providing versatility in holding and using the self-massage tool 100. The handles 200, 205 have a soft rubber-based grip for providing holding comfort to the user. In an example embodiment, the handles 200, 205 may be a shaped element such as a U-shape.

In an embodiment, frame 115 has rods 210, 215 along the length of the frame and in connection with the two curved handles 200, 205. In an embodiment, frame 115 has rods 210, 215 along a length of the frame 115 and connect the two curved handles 200, 205. The rods 210, 215 are parallel to each other and have the same length. The rods 210, 215 may be in direct connection with the handles 200, 205, such as, by way of adhesive or weld. They may also be attached by indirect means, such as, by a fastener, coupling, adapter, clamp, or other means. In an embodiment, the rods 210, 215 and handles 200, 205 are manufactured as a single part. As shown in FIG. 2, the rods 210, 215 are of cuboid shape, it is understood that other shapes such as, but not limited to, cylindrical shape may also be covered within the scope of the present invention. In an example, the rods 210, 215 may be adjustable or telescopic in length to allow the user to customize the length of the rods 210, 215 as per requirement of the user. The outer surface of the rods 210, 215 is smooth and glossy. These rods 210, 215 have a polished metal surface that minimizes friction and allow the first and second bodies 105, 110 to slide on the rods 210, 215 smoothly. In some embodiments, at least one of the rods 210, 215 may comprise a recess or series of recesses along the length of the rod on at least one side of the rod. The recess or series of recesses may be used in combination with at least one locking mechanism of the first body or second body.

Figure 3A:
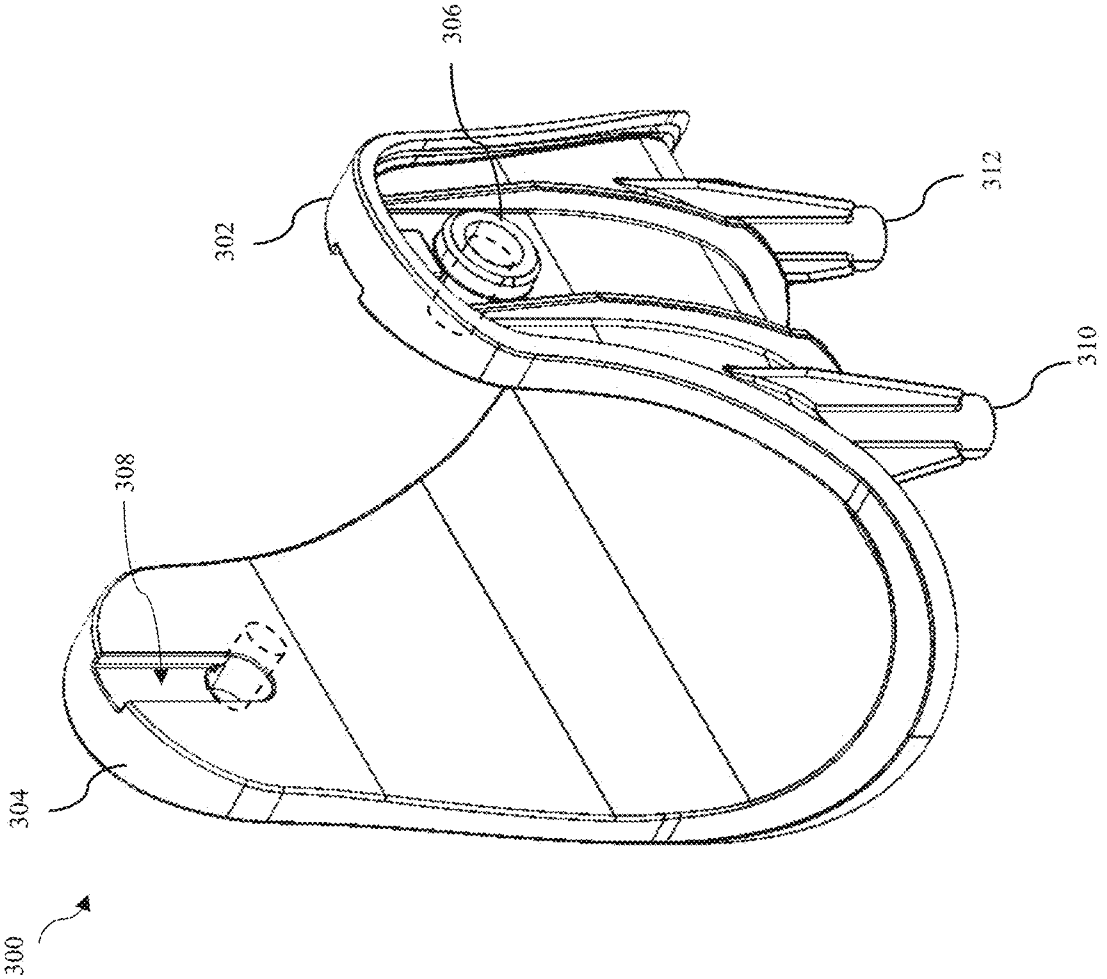
FIGS. 3A and 3B are perspective views of inner and outer parts of an upper part of a first body of a self-massage tool, respectively, according to an example embodiment.
Figure 3B:
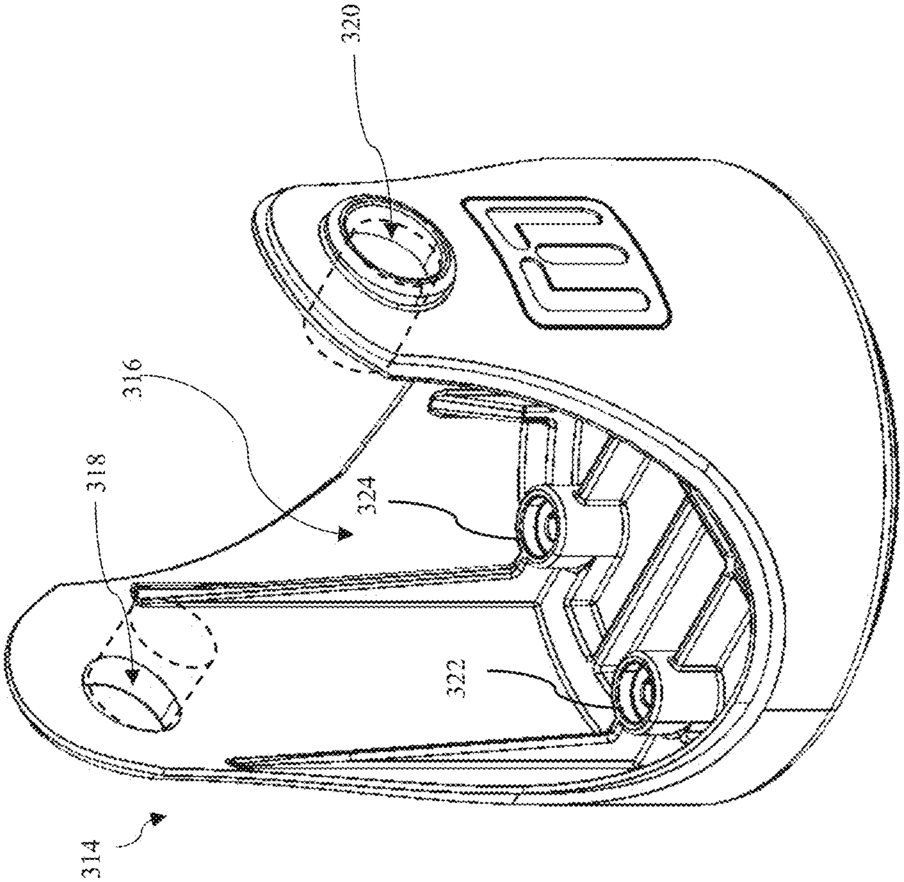

FIGS. 3A and 3B illustrate an inner part 300 and an outer part 314 of the upper part 120, respectively. As would be understood that the upper part 120 and the upper part 130 have the same construction and shape, the inner part 300 and outer part 314 have the same structure as the inner part and outer part of the upper part 130. In an assembled state, the inner part 300 and the outer part 314 are snap-fitted to each other. As shown in FIG. 3A, the inner part 300 has sidewalls

302 and 304, an element 306 that defines a central hole and an indented space 308. The indented space 308 receives an axle or a bearing, such as pins 146 of the first rolling member 140. As shown, the sidewalls 302 and 304 define a cradle shape and the first rolling member 140 is mounted to the sidewalls 302 and 304 within the space of the cradle shape. The inner part 300 has projections 310 and 312 extending in the downward direction from the cradle shape. These projections 310 and 312 are inserted into receiving holes 322 and 324 of the outer part 314, as shown in FIG. 3B during assembly. The outer part 314 has an opening 320 to receive the element 306 of the inner part 300, and an opening 318 to receive another element (not shown in the figure) on the sidewall 304, opposite to the element 306, of the inner part 300. The outer part 314 defines a space 316 and the inner part 300 is disposed within the space 316 of the outer part 314 in the assembled state. In some embodiments, element 306 is a protrusion such as a pin, detent, or connecting member, which is configured to removably attach a rolling member to the upper part 130.

Figure 4B:
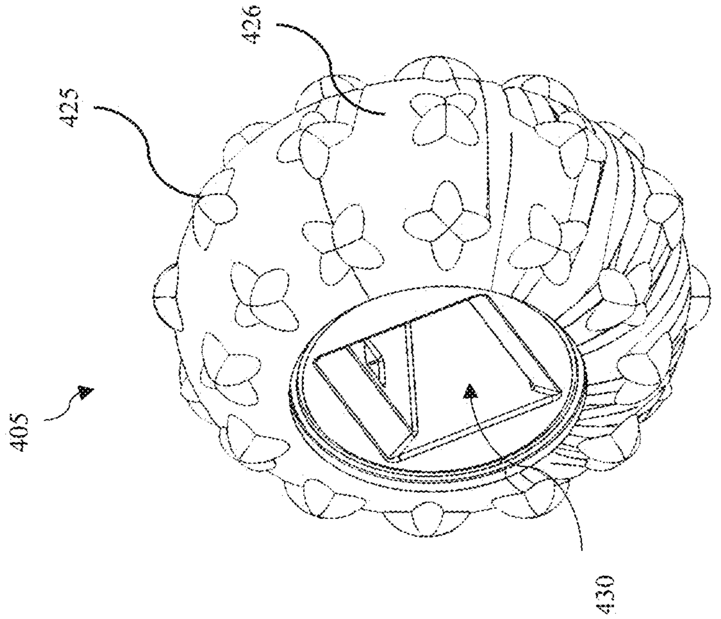
FIGS. 4A, 4B and 4C are perspective views various types of rolling discs for a self-massage tool, according to an example embodiment.
Figure 4A:
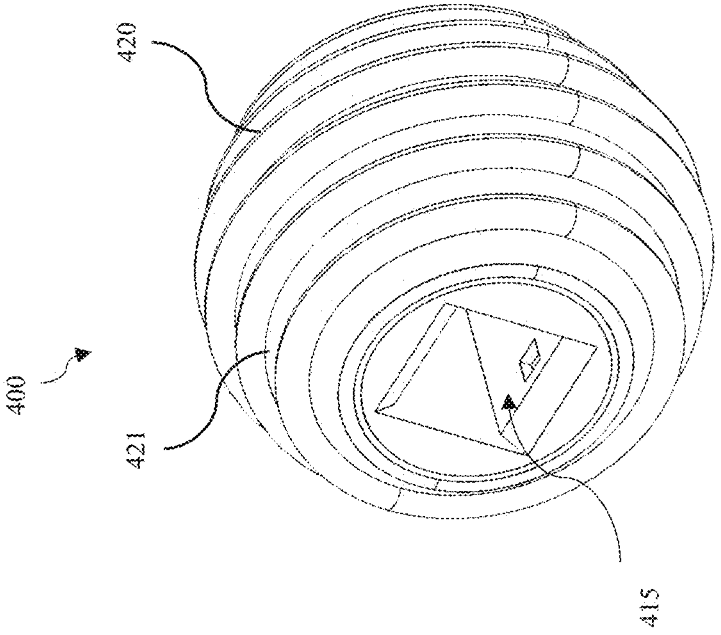
Figure 4C:
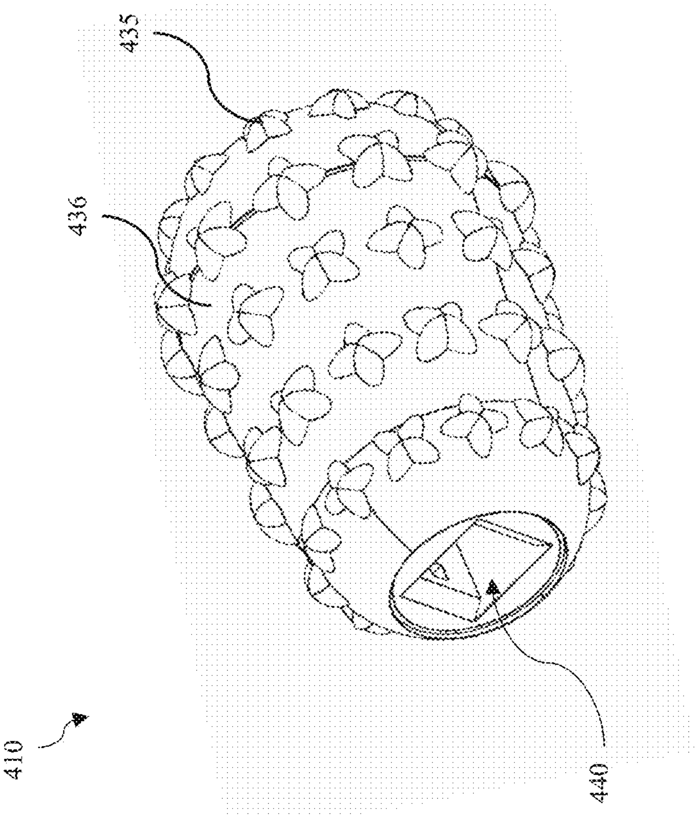

FIGS. 4A-4C illustrate various types of rolling discs, such as the first rolling member 140 and the second rolling member 145 used with the self-massage tool 100. FIG. 4A shows a rolling disc 400 having ridges 420 on the outermost surface 421 of the rolling disc 400. The ridges 420 extend along the circumference of the rolling disc 400 and are spaced apart from each other. Rolling disc 400 has a texture having smooth surface. The rolling disc 400 has a cavity 415 to receive an adapter that has the axle or the bearing for coupling with the inner part 300. The adapter is snap-fitted into the cavity 415 of the rolling disc 400. During assembly, the adapter allows the rolling disc 400 to mount on the inner part 300 by pressing the rolling disc 400 having the adapter into the indented space 308 of the inner part 300. The rolling disc 400, in one example, is removable from the inner part by applying a pulling force in an upward direction. In addition, cavity 415 also provides for connection with a connecting member 500, as shown in FIG. 5A, to allow coupling with another rolling disc in a second configuration.

FIGS. 4B and 4C show rolling discs 405 and 410 with knobs on an outermost surface 426, 436 of the rolling discs. The rolling disc 405 has plurality of knobs 425 evenly distributed across the outermost surface of the disc and the rolling disc 410 has plurality of knobs 435 distributed across the outermost surface 436. These knobs 425, 435 apply pressure on specific points on the body of the user during a massage to provide deep tissue and acupressure-based massage to the user. The rolling discs 400, 405, and 410 can roll back and forth in the assembled state to apply more pressure on a tissue on the body. As shown in FIGS. 4B and 4C, the rolling disc 405 has a cavity 430 and the rolling disc 410 has a cavity 440. The rolling disc 410 has greater width than the rolling disc 405.

Figure 5A:
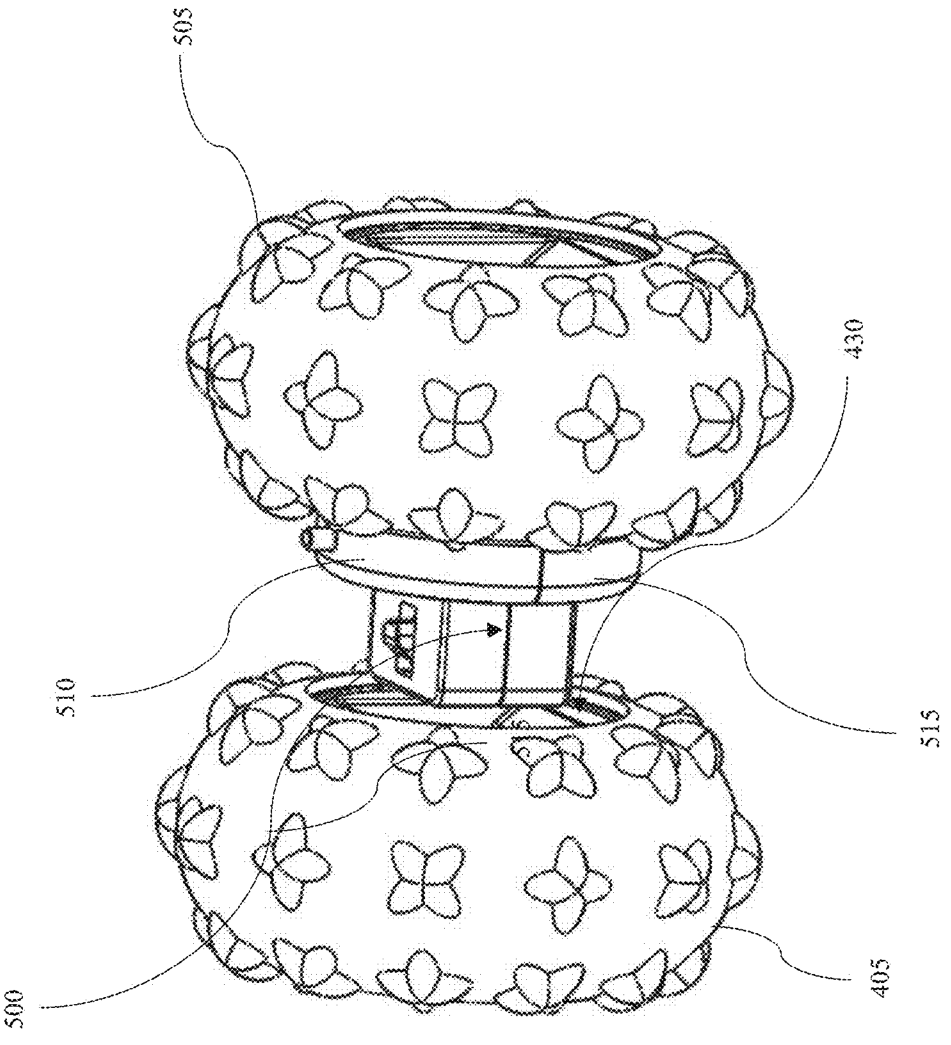
FIGS. 5A-5H are various views of a connecting element for coupling two rolling discs of a self-massage tool, according to an example embodiment.
Figure 5B:
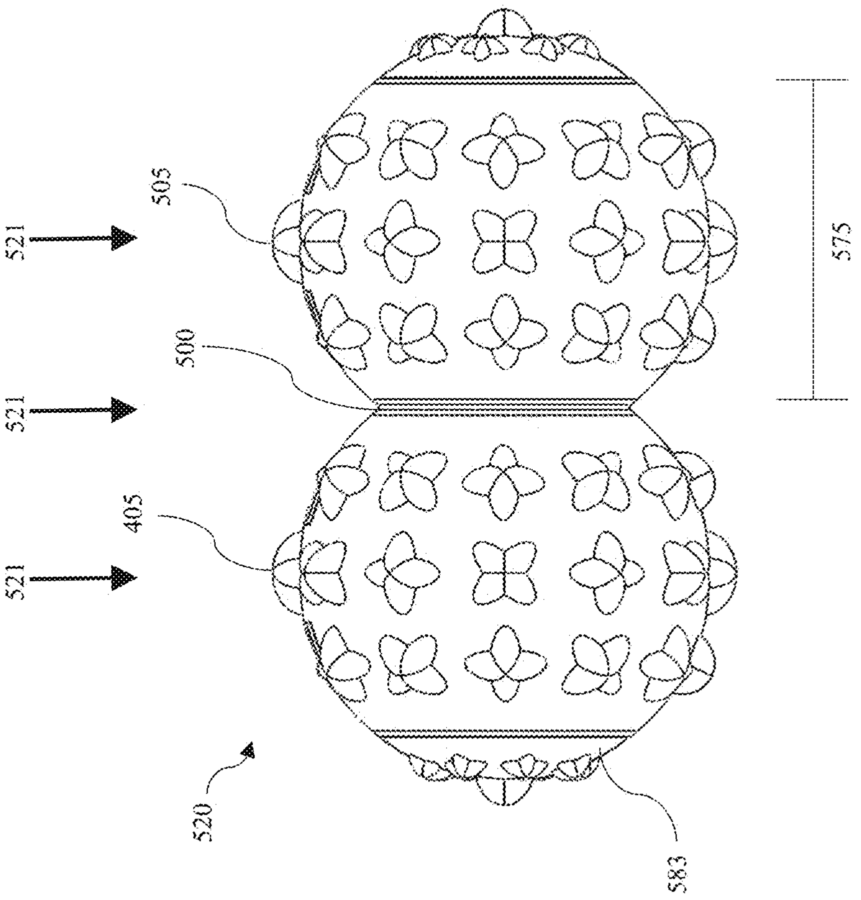
Figure 5D:
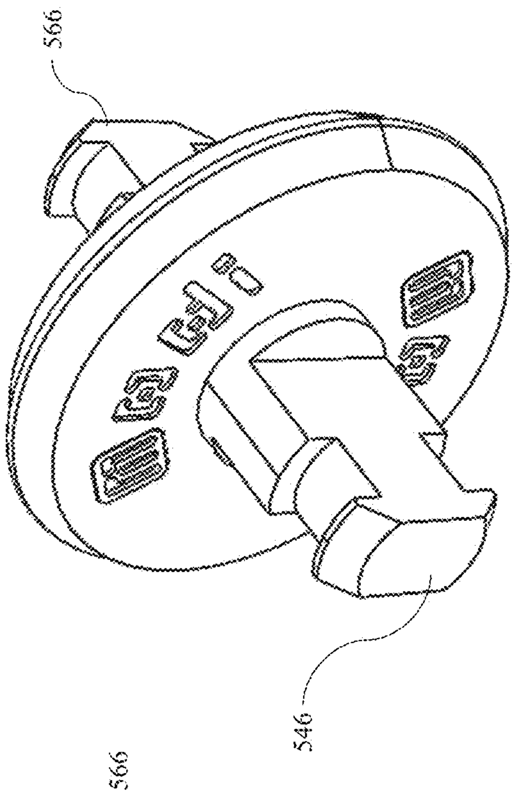
Figure 5C:
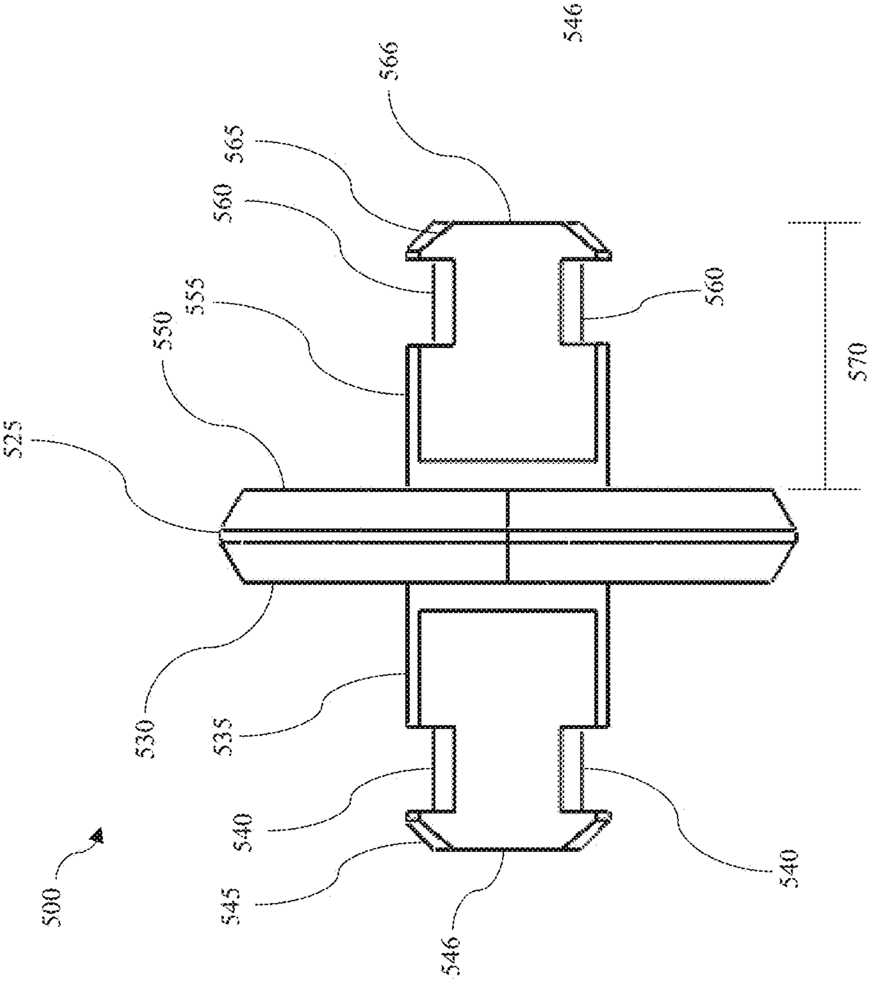
Figure 5F:
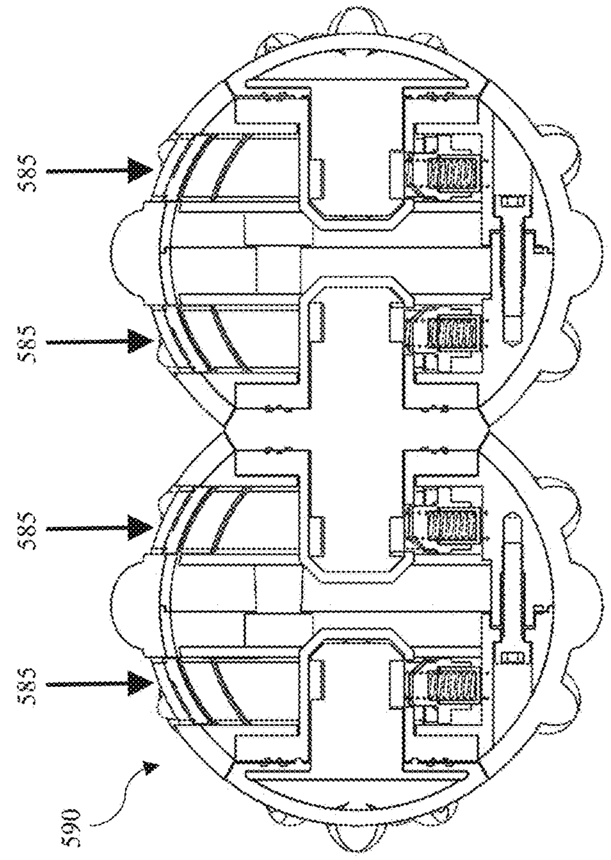
Figure 5E:
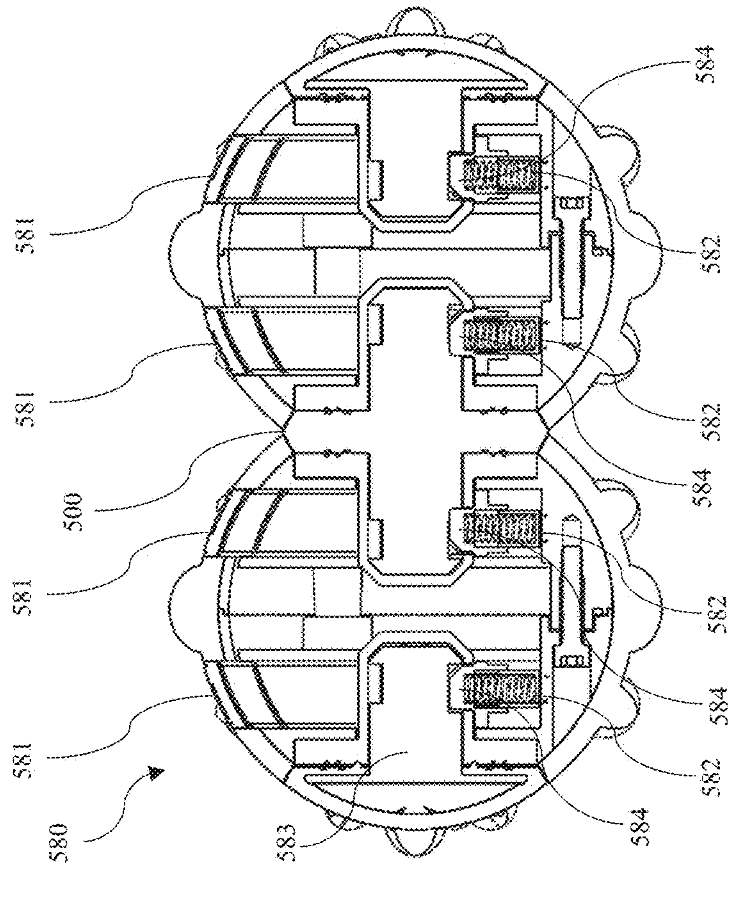
Figure 5H:
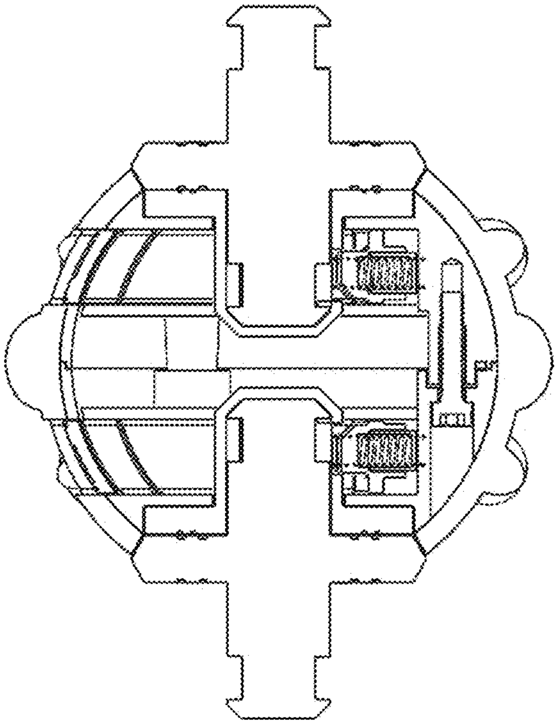
Figure 5G:
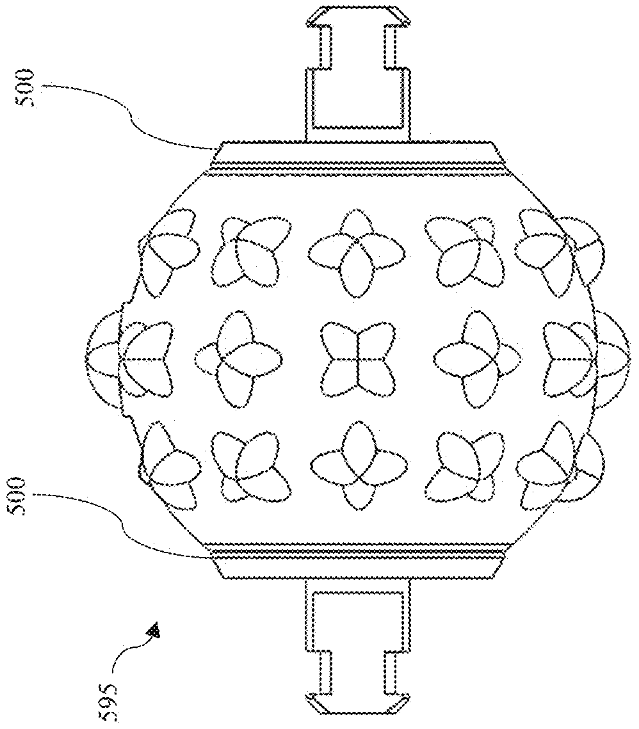

FIGS. 5A-5H illustrate a connecting member 500 for coupling two rolling members of a self-massage tool, according to an example embodiment. The connecting member 500 has a top part 510 and a bottom part 515. The bottom part 515 is fitted into a cavity of the rolling disc 505 and the top part 510 protrudes out from the rolling disc 505, as shown in FIG. 5A, For coupling the rolling discs 405 and 505, the top part 510 is fitted into the cavity 430 of the rolling disc 405, such that the top part 510 is positioned within the cavity 430 of the rolling disc 405 and the bottom part 515 is positioned within the cavity of the rolling disc 505. FIG. 5B illustrates a self-massage tool in a second configuration 520 when the rolling disc 405 is removably coupled to the rolling disc 505 via the connecting member 500. The second configuration 520 has the coupling between the two rolling discs 405 and 505 such that the discs 405, 505 can be coupled and separated from each other by the user with convenience. As disclosed herein, the rolling discs 405, 505 are of the same type having knobs on the surfaces and a width 575. The rolling discs 405, 505 may further be in attachment with a cover 583. It is understood that two rolling members of different types may also be coupled via the connecting member 500. FIGS. 5C and 5D illustrate a front view and a perspective view, respectively, of the connecting member 500. The connecting member further comprises disc 525 having a first side 530 and a second side 550; a shank 535, 555 extending outwards from each of the first side and the second side. Each shank 535, 555 further comprises at least one groove 540, 560; a flange section 545, 565 defined by each groove on each shank, and a terminating end 546, 566. Each shank extends has a length 570 such that the terminating end 546, 566 of the shank extends at least ¼ of the width 575 of the rolling disc 405, 505. FIGS. 5E and 5F illustrate partial sectional side views of a self-massage tool, operating in a second configuration 520, in a locked position 580 and an unlocked position 590. FIG. 5E further illustrates a rolling disc comprises at least one button 581 in attachment with a spring 582, and a protruding member 584. In an example embodiment, spring 582 and protruding member 584 are abutting and operatively connected to the button 581 such that when the button is engaged, the spring compresses and the protruding member moves with an end of the spring. FIGS. 5G and 5H illustrate a front view and a front sectional view, respectively, of a rolling disc in attachment with two connecting members 595.

Figure 6B:
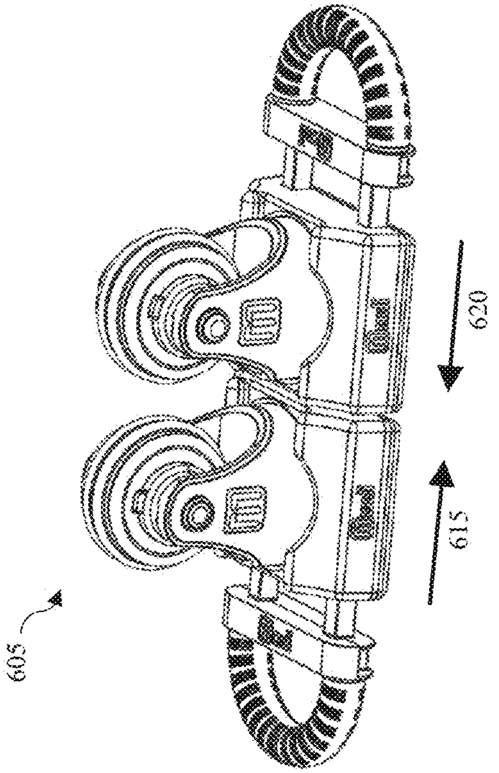
FIGS. 6A and 6B is a perspective view of a first position and a second position of a self-massage tool, respectively, according to an example embodiment.
Figure 6A:
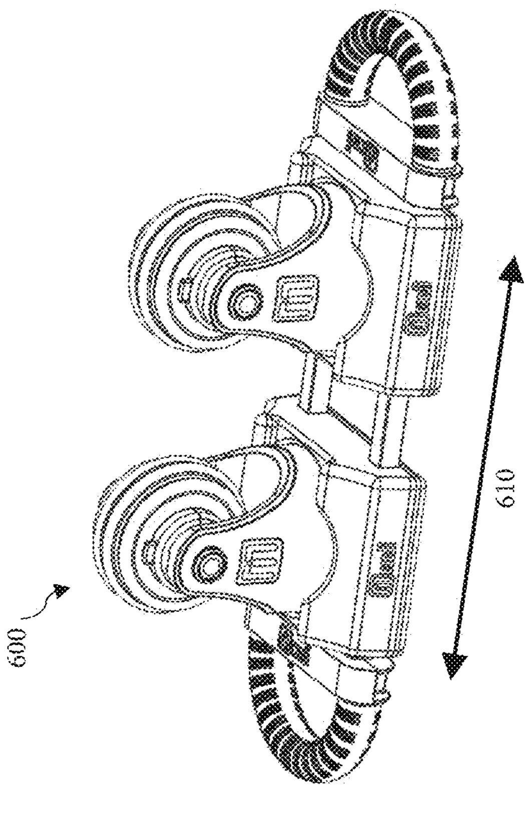

FIGS. 6A and 6B illustrate a first and second position 600 and 605 of the first and second body 105, 110 on the frame 115 of the self-massage tool 100, according to an example embodiment. As shown in FIG. 6A, the first and second bodies 105, 110 can move bidirectionally along the arrow 610 relative to each other on the two rods 210, 215 of the frames 115. FIG. 6B shows the first and second bodies 105, 110 moving close to each other along the arrows 615 and 620 such that one side of the lower part 125 of the second body 110 is in contact with one side of the lower part 135 of the second body 110.

Figure 7:
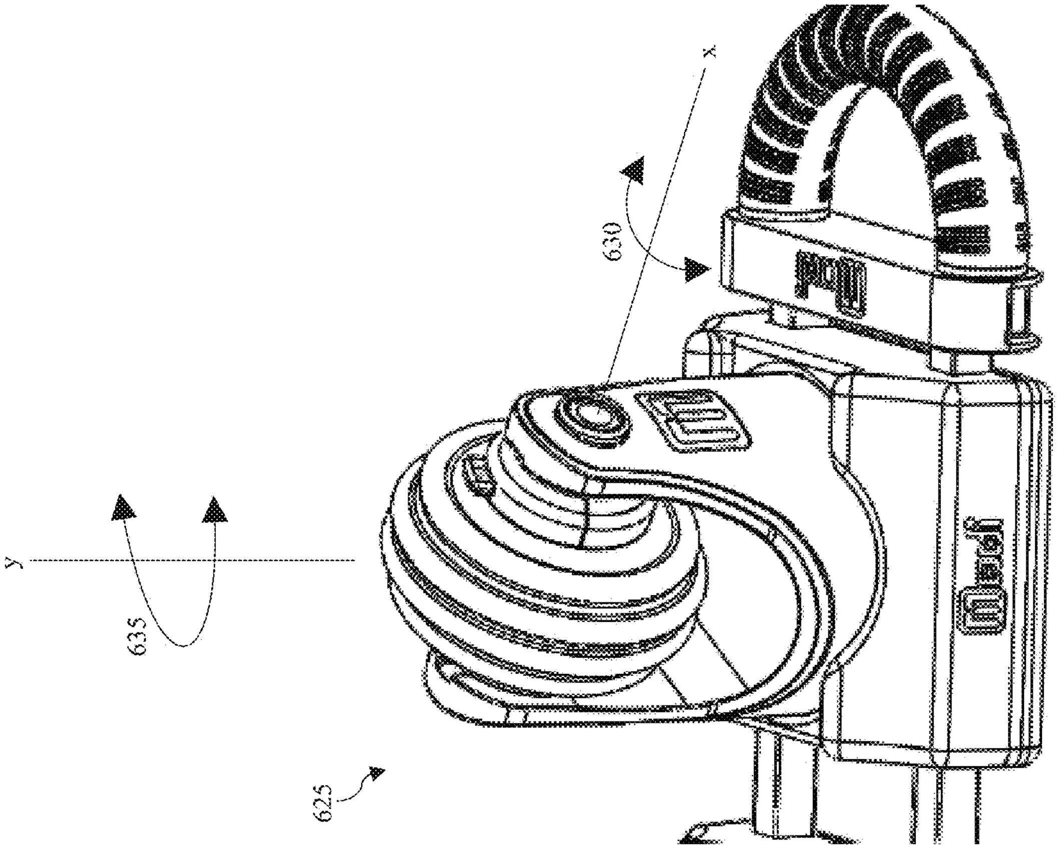
FIG. 7 is a perspective view of a portion of a self-massage tool, according to an example embodiment.

FIG. 7. illustrates an operation mode 625 of a self-massage tool, according to an example embodiment. As shown, each of the first rolling member 140 and the second rolling member 145 may rotate along an x-axis within the upper part 120 and the upper part 130, respectively. For example, as shown along the arrow 630, the rolling members 140, 145 can rotate back and forth in a circular motion during the massage. The upper parts 120 and 130 may also rotate in a circular motion along a y-axis, for example along the direction 635, relative to the lower parts 125 and 135 respectively to have different orientations for the first and second bodies 105, 110.

Figure 8B:
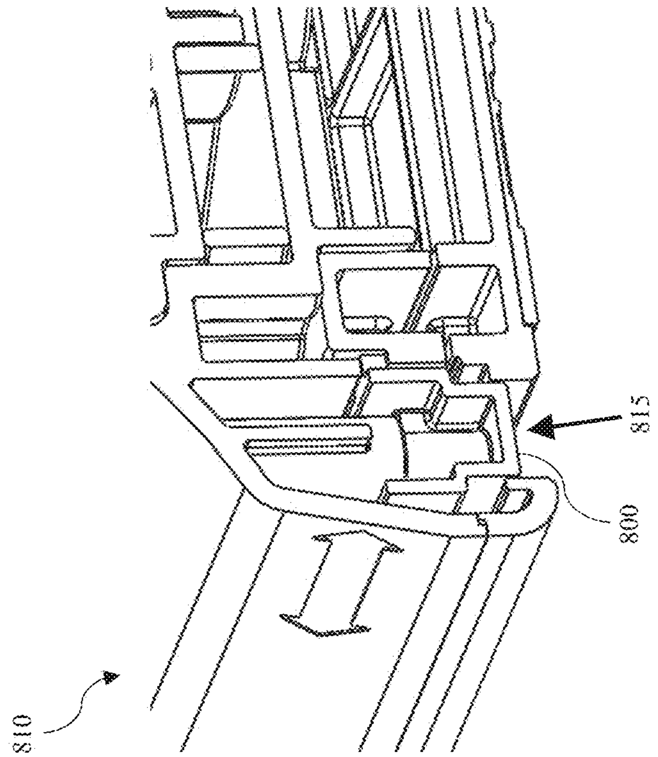
FIGS. 8A and 8B are perspective views of a first locking mechanism coupled to a lower part of a first body and a rod, in the unlocked position and locked position, respectively; according to an example embodiment.
Figure 8A:
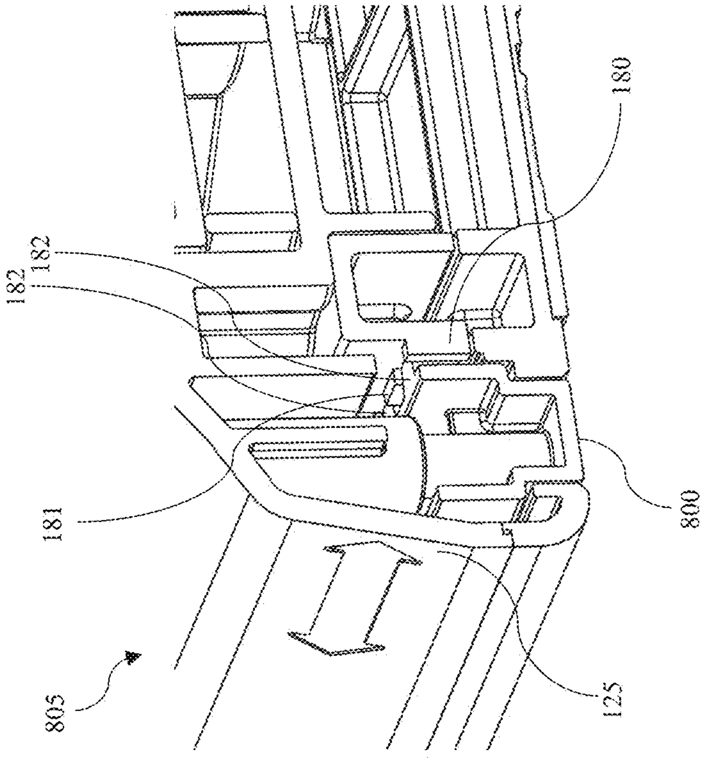

FIGS. 8A and 8B illustrate a first locking mechanism 800 in the locked position 805 and unlocked position 810, respectively. The first locking mechanism 800 is coupled to the lower part 125. As shown, the first locking mechanism 800 comprises locking teeth 182 that interlock with the rod teeth 181. In locked position 805, the locking teeth 182 and rod teeth 181 are interlocked, thus preventing the first body 105 from moving along the length of the rod. In the unlocked position 810, the first locking mechanism 800 is engaged by pressing the button 150. When the button is engaged, the locking teeth 182 shift in the direction 815 and disengage from the rod teeth 181. In unlocked position 810, the locking teeth 182 and rod teeth 181 are no longer in an interlocked position and the first body 105 moves along the length of the rod.

Figure 9A:
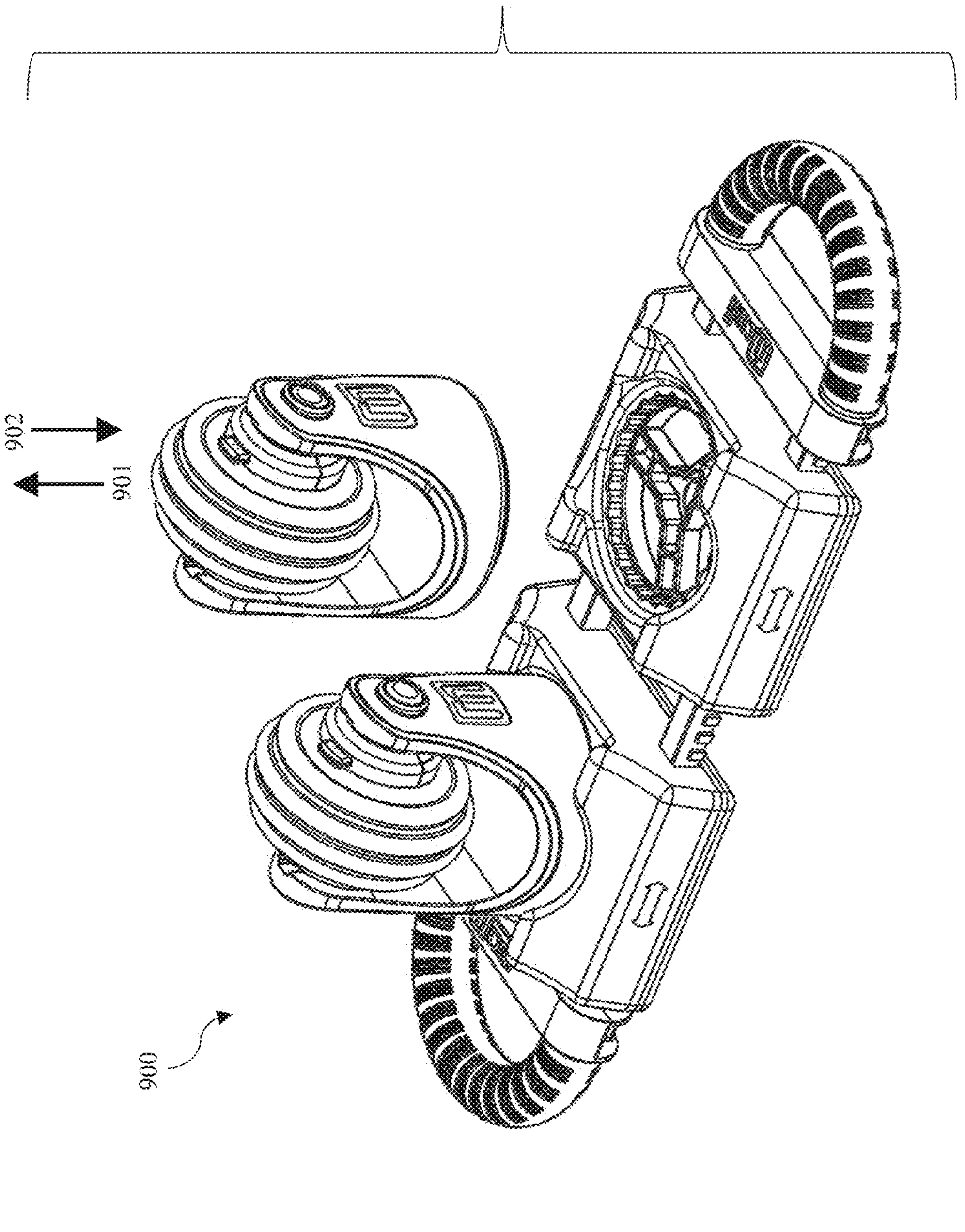
FIGS. 9A, 9B, and 9C are various views of a third locking mechanism according to an example embodiment.
Figure 9C:
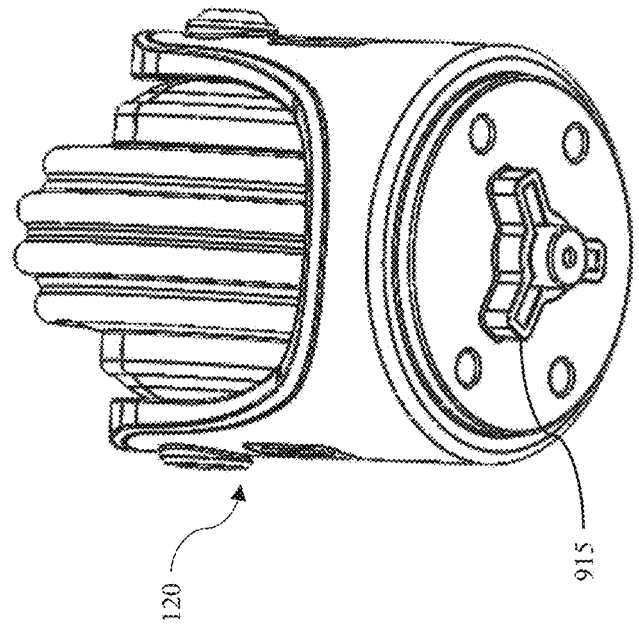
Figure 9B:
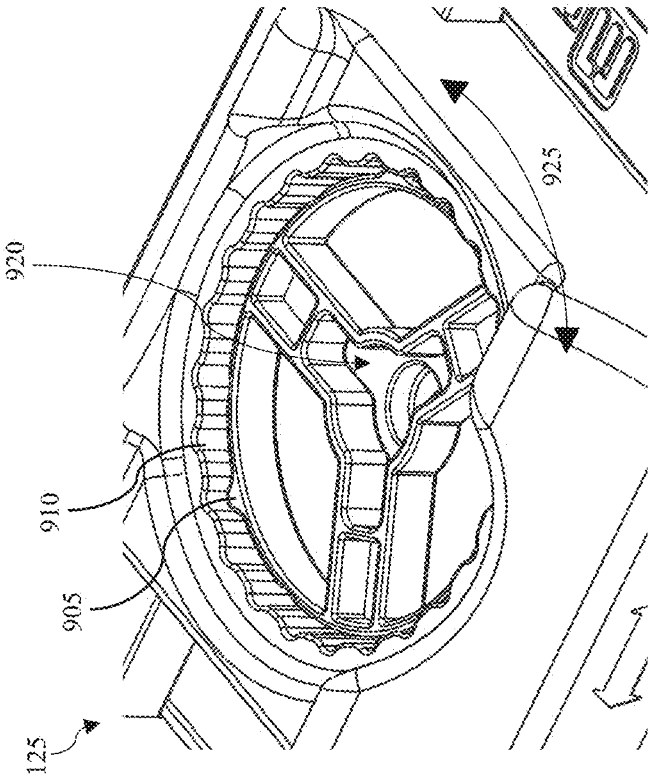

FIGS. 9A, 9B, and 9C illustrate a third locking mechanism 900, according to an example embodiment. The third locking mechanism 900 is in attachment with the lower part 125 and comprises an inner gear 905, outer gear 910, and a receiving member 920. The receiving member is configured to receive a protruding member 915 of the upper part 120. The lower part 125 and upper part 120 can be removably attached by inserting the protruding member 915 into the receiving member 920 in the 902 direction. The lower part 125 and upper part 120 can be disengaged by removing the protruding member in the direction indicated by line 901.

In operation, the user selects a type of rolling disc from amongst the rolling discs 400, 405, 410 for performing the massage and couples the rolling disc to the upper parts 120, 130 via the adapters. The user may then change the orientation for the first and second rolling members 140 and 145 based on turning the upper parts 120, 130 relative to lower parts 125, 135 that are fixed. Thereafter, relative position of the first body and the second body 105 and 110 may be altered based on an area or a part of the body to massage. The user has the flexibility of moving the first and second bodies 105, 110 apart or closer based on the requirement. The user may then use the self-massage tool 100 on the area or the part of the body to massage.

Referring to FIGS. 1A-9C, the disclosed embodiments disclose a self-massage tool 100.

The self-massage tool 100 comprises at least one rod 180, a first body 105 and a second body 110, wherein each of the first body and the second body comprise an upper part 120, 130 and a lower part 125, 135. The shape of at least one rod may be cuboid or cylindrical and is made from metal, wood, plastic, or other materials. The diameter of the rod remains consistent unless it is designed with specific tapers or contours. The rod has a smooth, glossy texture to reduce friction. The rod may comprise a recess or series of recesses along its length on one or more sides. The recess or series of recesses, sometimes referred to as teeth may be used in a ratchet-type locking mechanism. The first body and the second body are movably coupled to the rod such that each body can slide independently along the length of the rod. Each of the first body and second body may further comprise locking mechanisms, described further below.

The massage tool further comprises a first rolling member 140, in a first configuration 101. The rolling member is movably mounted to a first arm 160 and a second arm 165 extending from the first body. A second rolling member 145, in the first configuration, is movably mounted to a first arm 170 and a second arm 175 extending from the second body. In the first configuration, each of the first rolling member and second rolling member are disengaged from each other. The first rolling member and second rolling member, sometimes referred to collectively as the rolling members, may be of varying shapes such as disks, balls, or other spherical or cylindrical shapes. The surfaces of the rolling members may be smooth, flat, or textured. The rolling members may comprise concentric grooves, rings, or knobs or a series concentric grooves rings or knobs along the circumference of the surface. The rolling members may further comprise pins 131 that allow the rolling members to be removably attached to the first body and second body by way of the first arms 160, 170 and second arms 165, 175. Each of the first arms and second arms, sometimes referred to as arms, may comprise a hole or recess that allows for engagement of the pins of the rolling members. The arms may act as a cage or bracket structure that cradles the rolling members while leaving much of its surface exposed. The rolling members are held securely by the arms but can still move freely within.

The massage tool further comprises a first locking mechanism 800 operatively coupled to the lower part of the first body and the rod, wherein the first locking mechanism comprises a locked position 805 and an unlocked position 810, wherein the first body is prevented from moving along the rod in the locked position and the first body 105 is movable along the rod 180 in the unlocked position. In some embodiments, there is a second locking mechanism operatively coupled to the lower part of the second body 110 and the rod, wherein the second locking mechanism comprises a locked position and an unlocked position, wherein in the locked position the second body is prevented from sliding on the rod in the locked position and the second body is movable on the rod in the unlocked position. The locking mechanisms may be levers, pawls, or teeth similar to the rod teeth 181. The locking mechanisms engage the rod teeth along the length of the rod to allow for precise movement of the first body and second body along the length of the rod and to prevent unwanted movement of the first body and second body. The locking mechanisms may be operated by buttons 150, 155 placed on the lower parts 125, 135 of the first body and second body. When pressed, the buttons will disengage the locking mechanism e.g., the pawl, and allow for free movement of the body along the length of the rod. In an example embodiment, the locking mechanism has locking teeth 182 that are configured to interlock with the rod teeth 181. The pair of teeth interlock such that the body is prevented from moving along the length of the rod. In the locked position, as shown in FIG. 8A, the rod teeth and locking teeth are aligned such that the two sets of teeth are in parallel and intertwined, thus preventing the first body and rod from moving relative to each other. As shown in FIG. 8B, in the unlocked position, the locking mechanism is shifted in the direction 815, wherein the rod teeth and locking teeth are still in parallel but no longer intertwined. In the unlocked position, the button 150,155, is engaged and the locking teeth are positioned above the rod teeth such that the locking teeth can pass over the rod teeth while the body is moved along the length of the rod. When the body is at the desired position relative to the rod, the button is no longer engaged, and the locking mechanism will revert back to the locked position and the rod teeth and locking teeth will once again be in parallel and intertwined.

The massage tool further comprises a second configuration 520 wherein, a first rolling disc 405 is operatively coupled together with a second rolling disc 505 by a connecting member 500 such that the first rolling member and the second rolling member cannot move relative to each other. In the second configuration, the rolling members may be used in attachment with the first body and second body or may be used as a separate massage tool, independent of the remaining parts.

The connecting member comprises a disc 525 having a first side 530 and a second side 550; a shank 535, 555 extending outward from each of the first side and the second side; at least one groove 540, 560 on each shank; and a flange section 545, 565 defined by each groove on each shank. Each shank must be of the proper length such that when the massage tool is in the second configuration, the connecting member does not unintentionally disengage from the rolling member. The shank has a length 570 such that a terminating end 546, 566 of the shank extends at least ¼ of a width 575 of the first rolling member and the second rolling member. In some embodiments, the shank extends more than ¼ of the width 575 of the first rolling member e.g., ⅓, ½, ⅔, ¾, or the full width of the first rolling member. If the shank has a length that is less than at least ¼ of a width of the rolling member, the connecting member will disengage from the rolling member when the massage tool is in use, e.g., when the massage tool is in the second configuration and a force is applied to the massage tool by the user in the direction 521. When the shank has a length that is at least ¼ of the width of the rolling member, the connection between the connecting member and the rolling member is stable, e.g., the massage tool is in the second configuration and a force is applied to the massage tool by the user in the direction 521, the connecting member will not disengage from the rolling member.

The massage tool in the second configuration may further comprise a protruding member 584 disposed in a cavity 415, 430, 440 of the first rolling member engaging with the flange section 545 of the first side of the disc and a second protruding member 584 disposed in a second cavity 415, 430, 440 of the second rolling member engaging with the flange section 565 of the second side of the disc. The protruding member is in attachment with button 581 and a spring 582. The protruding member and the spring are in attachment such that they are abutting. When the spring is compressed, the protruding member moves in the direction of the compression. The button and the spring are in attachment such that when the button is engaged, the spring is compressed or further compressed by the button or by an intermediary that is in attachment with the button and the spring. The button is engaged by pressing it in the direction of 585 as shown in FIG. 5D. When the button is not engaged, the massage tool in the second configuration is in the locked position 580. When the button is engaged, the massage tool in the second configuration is in its unlocked position 590. In the unlocked position, the spring is more compressed than it is when the lock is in the locked position. The engagement of the button applies force to the spring, pushing it inward and compressing it further. In the locked position, the spring is considered to be in its natural state biasing outward. The spring in the locked state is less compressed. The spring may still hold some tension, but the overall compression is reduced compared to the unlocked state. In this locked position, the lack of engagement with the button allows the lock to secure itself, possibly by allowing internal components to engage with one another to prevent unlocking.

The connecting member 500 may be removably attached to the first rolling member and the second rolling member by inserting the shank 535, 555 into the cavity of the first rolling member. When inserting the shank into the cavity, the flange section 545, 565 exerts a downward force onto the protruding member thereby compressing the spring and allowing the shank to pass through the cavity until the flange section has moved completely over the protruding member. Once the flange section has completely bypassed the protruding member, there is no longer a downward force acting on the protruding member and the spring will revert to its natural state wherein the protruding member will be engaged with the groove 540, 560 of the shank. When the shank fully engages the cavity, the full length of the shank is within the cavity and the terminating end 546, 566 of the shank 535, 555 extends at least ¼ of the width of the rolling member. In this state, flange section 545, 565 will act as a locking mechanism, preventing the connecting member from disengagement with the rolling member. In the second configuration, the protruding member 584 engages with the shank 535, 555 such that the protruding member rests within groove 540, 560 of the shank. The groove has a height such that flange section is defined so that it engages with the protruding member within the cavity of the rolling member so that the protruding member and flange section engage with each other preventing the rolling member and the connecting member from disengaging when in the locked position 580 thus defining the second configuration of the tool. When the button 581 is engaged, the protruding member and the flange section are no longer in engagement and the massage tool in the second configuration is in the unlocked position 590, allowing the user to release the connecting member 500 from the cavity.

In another embodiment, the massage tool in the second configuration may further comprise at least one cover 583. The cover may comprise a cover side and shank side, wherein the shank side comprises a groove, a flange defined by a groove, and a terminating end. The cover side of the cover may be smooth or may comprise knobs similar to the knobs of a rolling member. The shank side of the cover is configured to removably attach to a rolling member by inserting the shank into the cavity of the first rolling member. When inserting the shank into the cavity, the flange section exerts a downward force onto the protruding member thereby compressing the spring and allowing the shank to pass through the cavity until the flange section has moved completely over the protruding member. Once the flange section has completely bypassed the protruding member, there is no longer a downward force acting on the protruding member and the spring will revert to its natural state wherein the protruding member will be engaged with the groove of the shank. When the shank fully engages the cavity, the full length of the shank is within the cavity. When button 581 is engaged, the protruding member and the flange section are no longer engaged and the massage tool in the second configuration is in the unlocked position, allowing the user to release the cover from the cavity. In some embodiments, a rolling member may be in connection with two covers. In some embodiments, two rolling members are in connection with each other by way of a connecting member and each of the two rolling members is in connection with a cover.

In an example embodiment, a rolling disc is in connection with two connecting members 595. In this embodiment the connecting members are universal adapters, wherein, the shank ends, not engaged with the rolling disc, are configured to removably attach to the upper body by way of the indented space 308. In some embodiments, the shank ends may be detents, configured to attach to the upper body by way of the indented space 308.

In an example embodiment, the massage tool comprises a third locking mechanism, wherein, the third locking mechanism 900 is located on the lower part 125, 135. The third locking mechanism comprises an inner gear 905, outer gear 910, and receiving member 920. The third locking mechanism is operatively coupled with the upper part 120, 130 by way of a protruding member 915 that is configured to mate with the receiving member. The two gears are operatively connected to each other. Inner gear 905 is centrally located and meshes with the outer gear 910. It rotates inside the outer gear, similar to the inner ring of a bearing. The outer gear surrounds the inner gear and works in tandem with it, much like the outer ring of a bearing. When the upper part 125, 135 is rotated in a direction 635 along the y-axis, the protruding member 915 exerts a force on the receiving member 920 in the same direction, thereby causing the inner gear to rotate along the outer gear. A mechanism such as a pin, clutch, or friction-based system could be used to lock the inner and outer gears relative to one another. This locking could engage or disengage based on the position of the inner gear or an external trigger. When unlocked, the gears can rotate smoothly, allowing for free movement much like a bearing. When the locking mechanism is engaged, the gears prevent rotation, thereby locking the system in place. In an example embodiment, the third locking mechanism is always in a soft locked position, wherein the inner gear, which usually rotates freely inside the outer gear, encounters partial resistance. It may be slightly misaligned or engaged with a braking mechanism that limits its rotation but does not fully stop it. This might feel like a gentle friction or slip, rather than a complete lockout. The soft locking system could be something like a slip clutch, where when a certain amount of torque or resistance is applied, the mechanism engages to limit rotation. The soft lock nature of this setup means that it restricts movement without causing any jamming or complete stoppage. In the soft locked position, the upper part of the body can rotate relative to the lower part of the body in either the clockwise or counterclockwise direction or both directions, when a minimal force is applied. When no force is applied, the upper part will remain in a constant position relative to the lower part. In some embodiments, the inner gear 905 has at least one protrusion that fits into one of the grooves of the outer gear 910. When a rotational force is applied to the inner gear in direction 925 that is greater than the static force applied by the grooves of the outer gear, the inner gear rotates relative to the outer gear. If no rotational force acts on the inner gear, the inner gear remains in place relative to the outer gear.

In an example embodiment, the massage tool comprises a fully assembled configuration. In the fully assembled configuration the massage tool comprises a disc having a first side and a second side, a shank extending outward from each of the first side and the second side, a groove on each shank a flange section defined by each groove on each shank, a first rolling member, a protruding member disposed in a cavity of the first rolling member and, a second rolling member, and a second protruding member disposed in a second cavity of the second rolling member. In the fully assembled configuration, the protruding member is disposed in the cavity of the first rolling member and engages with the flange section of the first rolling member and the second protruding member is disposed in the second cavity of the second rolling member and engages with the flange section of the second rolling member.

In a further embodiment, the massage tool comprises a disassembled configuration, wherein, in the disassembled configuration the shank on the first side of the disc is not engaged with the flange section of the first rolling member.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A massage tool comprising:
- a first rod;
- a second rod parallel with the first rod;
- a first handle connecting a first end of the first rod with a first end of the second rod;
- a second handle connecting a second end of the first rod with a second end of the second rod;
- a first body and a second body, wherein each of the first body and the second body comprise an upper part and a lower part;
- a first rolling member, in a first configuration, movably mounted to a first arm and a second arm of the first body;
- a second rolling member, in the first configuration, movably mounted to a first arm and a second arm of the second body;
- a locking mechanism on the lower part of each of the first body and the second body that is operatively coupled to at least one of the first rod and second rod, wherein the locking mechanism comprises a locked position and an unlocked position, wherein in the locked position the respective body is prevented from translating substantially along the first rod and the second rod, and, in the unlocked position, the respective body can translate the first rod and second rod; and
  - a receiving portion on an upper surface of the lower part further comprises:
    - a recessed outer gear having a plurality of first teeth on an inner facing portion of the outer gear;
    - an inner gear rotatably disposed within the recessed outer gear, the inner gear comprising a second tooth on an outer facing portion of the inner gear;
    - the receiving member positioned within the inner gear and operatively coupled to the inner gear.

2. The massage tool of claim 1, wherein in a second configuration the first rolling member is operatively coupled together with the second rolling member by a connecting member such that the first rolling member and the second rolling member cannot move relative to each other.

3. The massage tool of claim 2, wherein the connecting member comprises:
- a disc having a first side and a second side;
- a shank extending outward from each of the first side and the second side;
- a groove on each shank; and
- a flange section defined by each groove on each shank.

4. The massage tool of claim 3, wherein in the second configuration, the massage tool comprises:
- a protruding member disposed in a cavity of the first rolling member engaging with the flange section of the first side of the disc; and
- a second protruding member disposed in a second cavity of the second rolling member engaging with the flange section on the second side of the disc.

5. The massage tool of claim 4, wherein, when in the second configuration, the shank extends into the cavity of the first rolling member such that a terminating end of the shank extends at least ¼ of a width of the first rolling member.

6. The massage tool of claim 1, wherein a receiving member of the lower part and a protruding member of the upper part comprise complementary, non-circular profiles.

7. The massage tool of claim 1, wherein at least one of the first rod and the second rod comprises a plurality of fixed teeth on an outer surface.

8. The massage tool of claim 1, wherein the locking mechanism comprises a retractable tooth within at least one of the first channel and the second channel of the lower part of each of the first body and the second body that can selectively mate with the plurality of fixed teeth on the outer surface of at least one of the first rod and the second rod.

9. A massage tool comprising:
- at least one rod;
- a first handle in connection with a first terminating end of the at least one rod;
- a second handle in connection with a second terminating end of the at least one rod;

a first body comprising an upper part and a lower part;
the lower part of the first body movably coupled to the at least one rod such that the first body is movable along the at least one rod, the lower part comprising:
at least one channel extending through the lower part;
a receiving portion on an upper surface of the lower part, the receiving portion comprising:
a recessed outer gear having a plurality of first teeth on an inner facing portion of the outer gear;
an inner gear rotatably disposed within the recessed outer gear, the inner gear comprising a second tooth on an outer facing portion of the inner gear;
a receiving member positioned within the inner gear and operatively coupled to the inner gear;
the upper part comprising a first arm and a second arm extending upward, the upper part comprising:
a substantially u-shaped body defined by a base and each of a first arm and a second arm extending upward from the base;
a protruding member extending from a bottom side of the base, the protruding member disposed within the receiving member of the lower part;
a rolling member movably mounted to the first arm and the second arm;
wherein the receiving member of the lower part and the protruding member of the upper part comprise complementary, non-circular profiles such that the upper part is coupled to the inner gear of the lower part such that it is rotatable relative to the lower part;
wherein the lower part of each of the first body and the second body is slidably coupled to the first rod and the second rod such that the first rod is positioned within the first channel of the lower part and the second rod is positioned within the second channel of the lower part.

10. The massage tool of claim 9, wherein in a second configuration the rolling member is operatively coupled together with a second rolling member by a connecting member such that the rolling member and the second rolling member cannot move relative to each other.

11. The massage tool of claim 10, wherein the connecting member comprises:
a disc having a first side and a second side;
a shank extending outward from each of the first side and the second side;
a groove on each shank; and
a flange section defined by each groove on each shank.

12. The massage tool of claim 11, wherein in the second configuration, the massage tool comprises:
a protruding member disposed in a cavity of the rolling member engaging with the flange section of the flange section on the first side of the disc; and
a second protruding member disposed in a second cavity of the second rolling member engaging with the flange section on the second side of the disc.

13. The massage tool of claim 9, wherein at least one rod comprises a plurality of fixed teeth on an outer surface.

14. The massage tool of claim 13, further comprising a locking mechanism comprising retractable tooth within at least one channel of the lower part of each of the body that can selectively mate with the plurality of fixed teeth on the outer surface of at least one rod such that the locking mechanism comprises a locked position and an unlocked position;
wherein, in the locked position, the retractable tooth is interlocked between the plurality of fixed teeth on the outer surface of the at least one rod such that the body is prevented from translating substantially along the at least one rod, and,
wherein, in the unlocked position, the retractable tooth is disengaged from the plurality of fixed teeth on the outer surface of the at least one rod such that the body can translate along the at least one rod.

* * * * *